(12) United States Patent
Bartig et al.

(10) Patent No.: US 11,408,457 B2
(45) Date of Patent: Aug. 9, 2022

(54) SELF-PIERCING RIVET AND SELF-PIERCING RIVETED JOINT

(71) Applicant: NEWFREY LLC, New Britain, CT (US)

(72) Inventors: Paul Bartig, Giessen (DE); Matthias Wissling, Giessen (DE)

(73) Assignee: NEWFREY LLC, New Britain, CT (US)

( * ) Notice: Subject to any disclaimer, the term of this patent is extended or adjusted under 35 U.S.C. 154(b) by 824 days.

(21) Appl. No.: 16/185,676

(22) Filed: Nov. 9, 2018

(65) Prior Publication Data

US 2019/0078601 A1 Mar. 14, 2019

Related U.S. Application Data

(63) Continuation of application No. PCT/EP2017/060992, filed on May 9, 2017.

(30) Foreign Application Priority Data

May 11, 2016 (DE) .......................... 202016102528.1

(51) Int. Cl.
*F16B 19/08* (2006.01)
*F16B 5/04* (2006.01)
*B21J 15/02* (2006.01)

(52) U.S. Cl.
CPC .............. *F16B 19/086* (2013.01); *F16B 5/04* (2013.01); *B21J 15/025* (2013.01); *F16B 5/045* (2013.01)

(58) Field of Classification Search
CPC ............. F16B 19/086; Y10T 29/49956; Y10T 29/49947; Y10T 29/5343; Y10T 29/49833; Y10T 29/49954
See application file for complete search history.

(56) References Cited

U.S. PATENT DOCUMENTS

| 9,067,276 | B2 | 6/2015 | Koppitz et al. | |
| 2010/0232906 | A1 | 9/2010 | Singh et al. | |
| 2015/0144602 | A1* | 5/2015 | Draht ..................... | B23K 20/02 228/141.1 |
| 2016/0084288 | A1 | 3/2016 | Chung et al. | |

(Continued)

FOREIGN PATENT DOCUMENTS

| CN | 101472690 A | 7/2009 |
| CN | 102741006 A | 10/2012 |
| DE | 102013013930 A | 2/2015 |

(Continued)

OTHER PUBLICATIONS

English translation DE102013013930 (Year: 2015).*

(Continued)

*Primary Examiner* — Jason L Vaughan
*Assistant Examiner* — Amanda Kreiling
(74) *Attorney, Agent, or Firm* — Michael P. Leary

(57) ABSTRACT

A self-piercing rivet for joining workpieces comprises: a head defining a head diameter, and a shank which defining a shank diameter. The shank on a foot end opposite to the head, partially defines an axial recess which has an axial depth. The shank further includes a flat surface portion or a circular cutter on the foot end. And an axial circular recess is partially defined in a transition portion between the head and the shank.

19 Claims, 3 Drawing Sheets

(56) References Cited

U.S. PATENT DOCUMENTS

2016/0123362 A1    5/2016  Iwase

FOREIGN PATENT DOCUMENTS

| EP | 0833063 B | 9/1997 |
| EP | 1229254 B | 2/2002 |
| EP | 2314890 B | 9/2010 |
| JP | 2006226302 A | 8/2006 |
| JP | 2015042417 A | 3/2014 |
| WO | 2015086203 A | 6/2015 |
| WO | 2015107350 A | 7/2015 |

OTHER PUBLICATIONS

Japanese Office Action dated Feb. 18, 2021.
Chinese Office Action dated Jan. 6, 2021.
Chinese Office Action dated Oct. 28, 2019.
Chinese Office Action dated Jul. 9, 2020.
European Office Action dated Jun. 30, 2020.

* cited by examiner

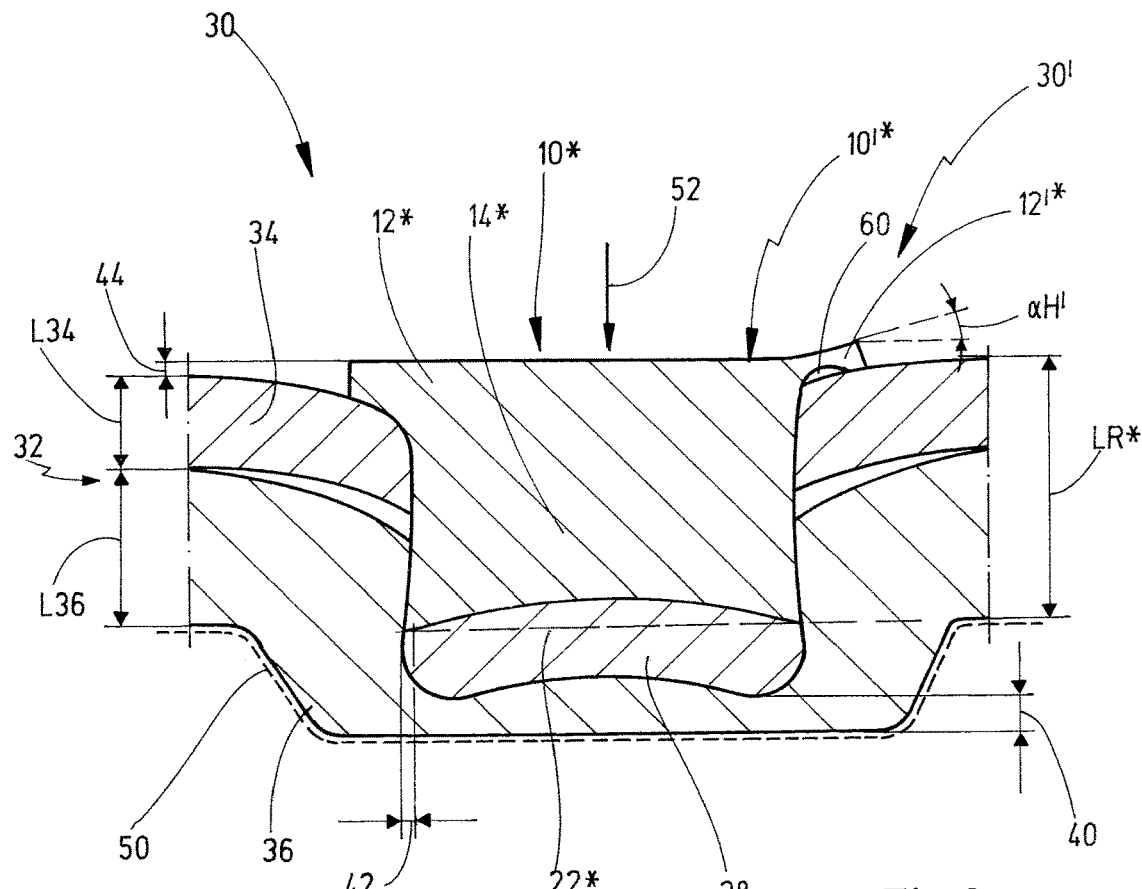
Fig.3
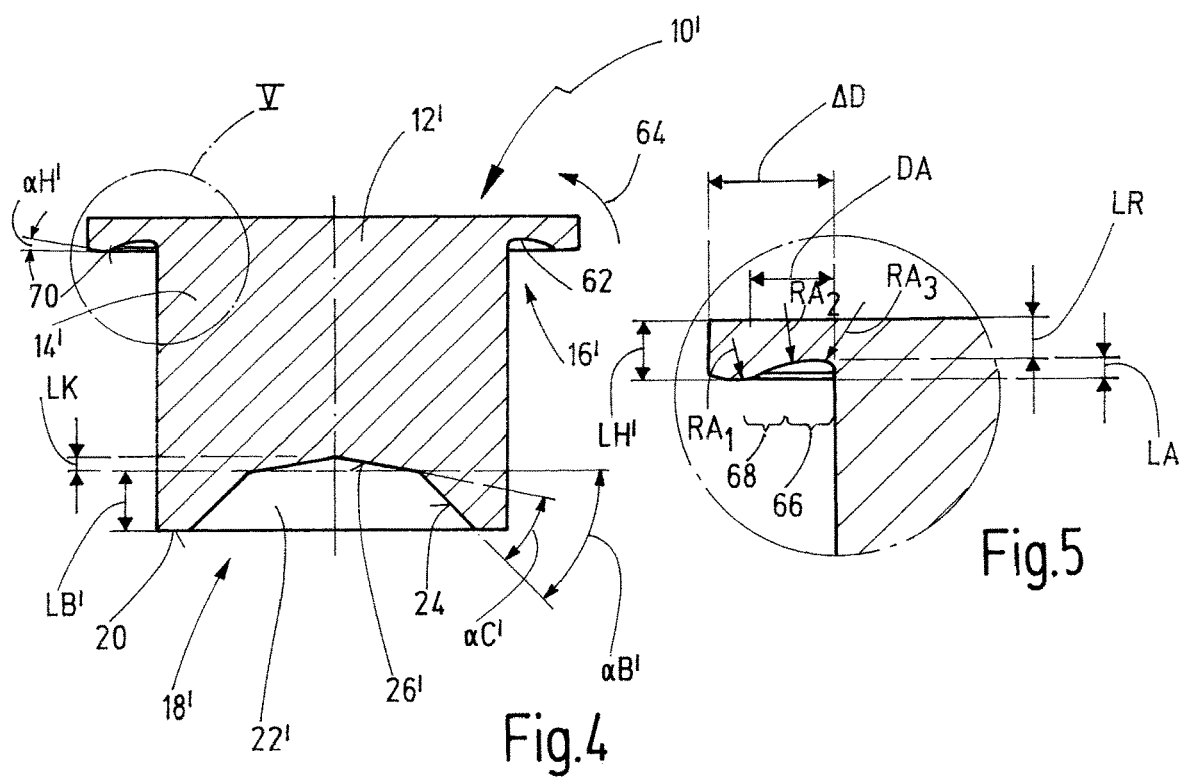
Fig.4
Fig.5

SELF-PIERCING RIVET AND SELF-PIERCING RIVETED JOINT

CROSS-REFERENCE TO RELATED APPLICATIONS

This application is a continuation of international application PCT/EP2017/060992, filed May 9, 2017 which claims priority from German Patent Application No. 202016102528.1 filed May 11, 2016, the disclosures of which are incorporated herein by reference in their entirety.

BACKGROUND OF THE INVENTION

The present invention relates to a self-piercing rivet for joining workpieces, in particular made from high tensile steels, having a head which comprises a head diameter, and having a shank which comprises a shank diameter, wherein the shank, on the foot end located opposite the head, comprises an axial recess which has an axial depth, wherein the shank comprises a flat surface portion or a circular cutter on the foot end.

In addition, the present invention relates to a self-piercing riveted joint having at least one upper workpiece and one lower workpiece, of which at least one is realized from a metal, in particular from a high tensile steel, and having a reshaped self-piercing rivet of the type designated above, the head of which abuts against the upper workpiece.

A self-piercing rivet with a flat surface portion at the foot end is disclosed in document DE 10 2013 020 504 A1. During a self-piercing riveting process carried out with the self-piercing rivet, said development of said self-piercing rivet produces a reshaping of the self-piercing rivet which is based less on the rivet shank spreading apart. The achievement of the relatively short axial depth of the recess rather is that the joint is formed as a result of a compressing of the rivet which is produced, in particular, by the counter-pressure of the high tensile steel of the workpiece arrangement. The undercut or the indentation, which is formed as a result, can be relatively small in this case. On account of the high tensile materials, even a relatively small undercut, however, is sufficient to realize the necessary joint tensile strength.

In addition, a self-piercing rivet is disclosed in document EP 1 229 254 A2. Said document proposes providing a self-piercing riveted joint with at least two joining parts produced from a high tensile steel which are joined together by means of a half-hollow self-piercing rivet, which is formed from steel and comprises a rivet head and a rivet shank, which connects thereto, with a rivet foot at the end, the rivet foot being realized in an obtuse manner in the initial state prior to the joining operation. The form of the self-piercing rivet, in this case, is to be identical to the form of a self-piercing rivet as is also known for joining light metal workpieces, from document EP 0 833 063 A1. A favourable reshaping behaviour of the half-hollow self-piercing rivet is to be achieved when joining the high tensile joining parts as a result of the obtuse realization of the rivet foot, the striving of the rivet shank to spread apart being reduced compared to a pointed rivet foot. In this case, the spreading apart is not to occur until the rivet shank penetrates into the lower joining part with the rivet foot. The joining parts are to comprise a tensile strength in excess of 500 N/mm$^2$, up to 1500 N/mm$^2$. The tensile strength of the half-hollow self-piercing rivet used is to be within a range of between 1200 and 1400 N/mm$^2$, but can also reach values of up to 2000 N/mm$^2$.

In order to ensure a suitable spreading-apart behaviour, the quotient from the axial depth of the shank cavity and the rivet foot outside diameter is to be between 0.3 and 0.7. Where an axial depth of the shank cavity is too small, the rivet shank is said not to spread apart sufficiently once the upper steel sheet has been perforated.

A further half-hollow self-piercing rivet is disclosed in document WO 2007/132194 A1. In this case, a central blind hole is to be provided in the shank, wherein the ratio of a difference between an outside and an inside diameter of the shank in the region of the hole is to be within the range of between 0.47 and 0.52.

In addition, document EP 2 314 890 A2 discloses a half-hollow self-piercing rivet for joining high and super high tensile steels, a head diameter generally being smaller than or equal to 1.3 times the shank diameter.

Self-piercing riveted joints of the prior art, by way of which high tensile or super high tensile steels are joined, can, however, still have various problems. On the one hand, the extent of the spreading apart may not be symmetrical with reference to a rivet axis. In addition, the shank can be pressed together and bent. In many cases, it is not even possible to press the rivet into the workpiece arrangement, it even being possible for the self-piercing rivet to fracture.

Self-piercing rivets which are designed to join high tensile or super high tensile steels as a rule comprise a flat surface portion at the foot end, as mentioned above. Other self-piercing rivets such as, for example, C-rivets comprise a circular cutter at the foot end of the shank. A circular cutter is formed, in particular by a cutting line between a radius or a chamfer in the region of an inside surface of the axial recess and a radius or a chamfer toward a radial outside surface of the shank. A circular cutter of this type should be realized for the purpose of severing an upper workpiece of a workpiece arrangement to be joined in a circular manner, the upper workpiece preferably being produced from a steel, but also being able to be produced from another material.

Self-piercing rivets of the above-described form comprise an under-head radius at a transition from the outside surface of the shank toward the head, and the head bottom surface is frequently inclined in relation to a radial plane of the self-piercing rivet and forms a cone portion.

Document US 2016/0084288 A1 has disclosed a half-hollow self-piercing rivet where a projection, which can be melted by means of a weld current in order to be welded with the lower workpiece of a workpiece arrangement, is realized at a foot end of the shank. In the case of said self-piercing rivet, the shank does not spread apart in the radial direction when the setting operation is carried out. In the region of an outside periphery of a head bottom surface, a head of said setting rivet comprises a cutting edge which protrudes axially forward and penetrates into an upper surface of an upper workpiece of the workpiece arrangement and is to generate a press fit as a result.

In the case of self-piercing rivet joints of the prior art, stresses can occur during setting operations in the region of a transition between the shank and the head.

BRIEF SUMMARY OF THE INVENTION

Against said background, it is an object of the invention to provide an improved self-piercing rivet as well as an improved self-piercing riveted joint, both of which are suitable for joining different materials, in particular metals, in particular aluminium or steel and in particular for joining high tensile and super high tensile steels.

Said object is achieved in the case of the self-piercing rivet named in the introduction as a result of an axial circular recess being realized in a region of a transition portion between the head and the shank.

The axial recess makes it possible to reduce the setting forces when setting or carrying out a self-piercing riveting procedure.

The achievement of reducing the setting forces means that damage to the self-piercing rivet and/or of one of the workpieces whilst the self-piercing riveting method is being carried out is less probable or even excluded. For precisely in the case of high tensile and specifically in the case of super high tensile metal sheets, as a rule the setting force increases dramatically as soon as a head bottom surface, which is frequently realized as a slant or with a positive radius, touches an upper surface of the upper workpiece of the workpiece arranged to be joined.

The bottom surface of the head in the region of the head protrusion in relation to the shank is preferably either aligned substantially radially or, however, is chamfered in relation to such a radial plane or is provided with a radius in such a manner that an angle between a shank outside surface and the head protrusion is greater than or equal to 80° and smaller than 140°. Consequently, the head protrusion is preferably not able to penetrate into an upper workpiece surface.

The circular recess makes it possible for the head protrusion to stand out in a circular manner in relation to a radial plane during the setting operation such that the head protrusion assumes an angle of greater than 0° in relation to the radial plane in the set state.

The self-piercing rivet according to the invention, however, is advantageous not only when used in self-piercing riveting procedures where high tensile and super high tensile metal sheets are used. The self-piercing rivet according to the invention is also advantageous in the case of other applications (composite construction, super high tensile steels, standard steel, CFK, Al).

In particular, when carrying out self-piercing riveting procedures using the self-piercing rivet according to the invention, cracks in the self-piercing rivet in the region of the transition portion between the head and the shank are prevented or are less likely to occur.

The circular recess can be realized in an angular manner, however is preferably realized in longitudinal section as a continuous recess with a constant recess development. It is particularly preferred when the recess is realized by a plurality of radii which each continuously connect to one another.

In the case of the self-piercing rivet according to the invention, the ratio of the axial depth of the recess to the shank diameter for applications in conjunction with high tensile steels is preferably smaller than 0.3, in particular smaller than 0.28 and in a particularly preferred manner is smaller than 0.25 or even smaller than 0.2.

The ratio of the axial depth of the recess to the shank diameter is preferably greater than 0.05 and preferably greater than 0.01 and in particular greater than 0.12.

In addition, the above object is achieved by a self-piercing riveted joint having an upper workpiece and having a lower workpiece, of which at least one is realized from a metal, in particular a high tensile steel, and having a reshaped self-piercing rivet, the head of which abuts against the upper workpiece, the self-piercing rivet being in particular a self-piercing rivet according to the invention.

Finally, the above object is achieved by a method for producing a self-piercing riveted joint, in particular a self-piercing riveted joint of the type designated above, having the steps of providing a workpiece arrangement, which comprises at least one upper and one lower workpiece, and driving a self-piercing rivet of the type according to the invention into the workpiece arrangement at a self-piercing force.

Where there is a flat surface portion at the foot end, during the self-piercing riveting procedure there is a reshaping of the self-piercing rivet which is based less on a spreading apart of the rivet shank. The achievement of a relatively short axial depth of the recess is that the joint is formed as a result of a compressing of the rivet which is brought about, in particular, by the counter pressure of the high tensile steel of the workpiece arrangement. The undercut or the indentation which is formed as a result can be relatively small in this case. On account of high tensile materials, even a relatively small undercut, however, is sufficient to realize the necessary joint tensile strength.

In addition, a further achievement of the preferred relatively small axial depth of the recess is that the self-piercing rivet maintains a clearly higher level of stability which makes it possible to punch through even high tensile and super high tensile steels.

The flat surface portion at the foot end forms a contribution to the novel production of self-piercing riveted joints with high tensile steels. In other words, it is preferred when the end face of the foot end, also designated as the cutting edge and being as a rule circular, is realized at least in portions in a flat manner, preferably aligned perpendicular to a longitudinal axis of the self-piercing rivet.

The upper workpiece of the workpiece arrangement is preferably produced from steel for this case and has a tensile strength which is preferably greater than 800 $N/mm^2$, in particular greater than 1000 $N/mm^2$. The tensile strength of at least the upper workpiece can be up to 1500 $N/mm^2$ and beyond.

The tensile strength of the bottom workpiece is—without heating—preferably limited to approximately 600 $N/mm^2$.

In other words, forming steels, as are known under the designation "Usibor®", where the micro-structure, prior to a heat treatment, consists, in particular, of a ferrite-perlite framework, are also able to be joined with the necessary joint strength using the self-piercing rivet according to the invention.

It is preferred that the strength or hardness of the self-piercing rivet is adapted in a corresponding manner. In addition, it is preferred that the self-piercing rivet is a half-hollow self-piercing rivet which is produced in particular so as to be rotationally symmetrical and/or in one piece from steel.

The minimum rivet length is preferably the thickness of the upper workpiece plus a length which is preferably greater than 2 mm and in particular equal to 3 mm. The maximum rivet length is preferably within the range of the thickness of the workpiece arrangement.

Whilst above-preferred developments of a self-piercing rivet are described for the application with high tensile and super high tensile steels, where the self-piercing rivet comprises a flat surface portion at the foot end and preferably a relatively small axial depth of a central recess, other application examples of the self-piercing rivet according to the invention can also be realized for applications with normal steels or other materials (for example aluminium).

In said case, the ratio of the axial depth of the recess to the shank diameter is preferably clearly greater than 0.5, in particular greater than 0.75 and can even reach values of 1 or above. In addition, in this case a circular cutter is preferably realized at the foot end of the shank, as has been disclosed in general, for example, for so-called C-rivets.

The object is consequently fully achieved.

It is particularly preferred in one variant when the head comprises a head bottom surface which is realized substantially perpendicular to a longitudinal axis of the self-piercing rivet.

In other words, it is preferred when a transition region between the shank and the head is not formed by a radius or an inclined cone surface. For this would result in said transition region, even at a relatively early time, contacting an upper surface of the uppermost workpiece when a self-piercing riveting procedure is carried out, which leads to high setting forces.

In other words, the development of the head, in such a manner that the head bottom surface thereof is realized substantially perpendicular to a longitudinal axis of the self-piercing rivet, can contribute to a reduction in setting forces.

According to an alternative development, the head comprises a head bottom surface which is aligned at an angle of between 5° and 45°, in particular between 5° and 20° or within a range of between 15° and 45° with reference to a radial plane.

In the case of said variant, a head bottom surface of the head is chamfered overall radially outside the axial circular recess or is realized in a substantially conical manner.

The setting forces are able to be clearly reduced in the case of said development too. As a result of the chamfer, in many embodiments after a setting operation and after bending off the head protrusion in the substantially axial direction, the inclined head bottom surface is able to rest in a substantially flat manner on an upper surface of the upper workpiece, for example for the purposes of providing a seal. This applies in particular when the self-piercing rivet is driven relatively far into the workpiece arrangement. An upper surface of the head of the self-piercing rivet is preferably aligned with an upper surface of the upper workpiece, or even lies somewhat below the upper surface of the upper workpiece such that the self-piercing rivet is quasi countersunk into the workpiece arrangement.

According to a further preferred embodiment, the axial circular recess is realized on a head bottom surface of the head which protrudes radially in relation to the shank.

In this connection, the circular recess preferably does not extend radially into the region of the shank.

In the case of said embodiment, high forces can still be transmitted in the axial direction by means of the shank, it being possible, where applicable, for the head protrusion to be bent off.

In addition, it is advantageous when the axial circular recess, in a first radial recess portion which faces the shank, comprises a greater axial depth than in a second radial recess portion.

This also contributes to the head protrusion being able to be bent slightly in relation to the radial plane during the setting operation. A virtual bending "axis", which is realized in this case in a circular manner concentrically with respect to a longitudinal axis of the shank, is preferably located in this case in the first radial recess portion.

The first radial recess portion is preferably directly adjacent the shank. The second recess portion is preferably at a spacing radially from a head outside periphery.

According to a further preferred embodiment, a ratio of the radial length of the axial circular recess to a radial head protrusion length is greater than 0.2. It is particularly preferred when said ratio is greater than 0.3, in particular greater than 0.4 or even 0.5. The ratio of the radial length of the axial circular recess to a radial head protrusion length is preferably smaller than 0.9, in particular smaller than 0.8 and preferably smaller than 0.7.

As a result, the setting force is able to be further reduced as a longer part of the head protrusion is bent off in relation to the longitudinal axis of the shank when a setting operation is carried out.

In addition, it is advantageous when a ratio of an axial depth of the axial circular recess to an axial head height is greater than 0.15. The ratio is preferably greater than 0.25, in particular greater than 0.3. The ratio is in particular smaller than 0.6, preferably smaller than 0.5 and in particular smaller than 0.4.

The maximum axial depth of the axial circular recess, which departs in the axial direction preferably from an axial position of the self-piercing rivet, which is defined by a bottommost position of the head bottom surface which is located radially outside the circular recess, is preferably assumed for calculating said ratio.

The above-named ratio of the axial depth of the circular recess to the axial head height also contributes to a reduction in the setting forces.

According to a further preferred embodiment, a head bottom surface of the head is chamfered in a portion radially outside the axial circular recess.

The chamfered portion, in the case of said embodiment, is either the entire portion of the head bottom surface located radially outside the axial circular recess. The chamfered portion of the head bottom surface, however, can also be at a spacing from the axial circular recess in the radial direction in such a manner that a substantially radially aligned head bottom surface portion is realized between the axial circular recess and the chamfered portion.

The chamfer is preferably such that said chamfered head bottom surface portion in the set state rests in a substantially flat manner on an upper surface of a joined workpiece.

A sealing tightness of the set self-piercing riveted joint can be increased as a result.

The alignment of the head bottom surface portion or of the cone angle thereof is preferably within a range greater than 0° and smaller than 45°. Said cone angle of the head bottom surface located radially on the outside preferably corresponds to an intended bending of the head protrusion when carrying out the setting operation in relation to a radial plane.

According to a further preferred embodiment, which provides an independent invention in conjunction with the preamble of claim 1, the central recess, in longitudinal section, is in the form of a truncated cone, wherein a recess bottom of the recess is realized in the form of a cone, wherein a ratio of a cone angle of the recess bottom to a cone angle of the recess is smaller than 0.4.

The ratio of said angle is preferably smaller than 0.3, in particular smaller than 0.25. Said ratio is preferably greater than 0.05 and in particular greater than 0.1, preferably greater than 0.2.

The cone-shaped recess bottom, which preferably forms a very flat cone, makes it possible, in particular, to simplify the producibility of the self-piercing rivet and/or to realize an optimized receiving of a slug and/or an improved radial widening for the purposes of forming an undercut when carrying a setting operation.

When the recess, in longitudinal section, is in the form of a truncated cone, the diameter of the recess in the region of the foot end is preferably greater than that in the region of a bottom of the recess. In the case of said embodiment, the bottom of the recess can preferably be flat, but can also be curved in a concave or convex manner, or realized in a cone-shaped manner, as above.

According to a further preferred embodiment, the central recess is arcuate in longitudinal section.

The arcuate form, in this case, can be produced by one single radius such that the recess, in longitudinal section, is in the form of a circular arc.

It is particularly advantageous, however, when the recess, in longitudinal section, comprises the form of a pointed arch or a gothic arch.

Such an arch form is produced by two arches constructed from circles with an apex.

In this case, it is preferred when the apex is rounded in a suitable manner by means of a radius.

In addition, it is preferred in the case of the pointed arch shape when the centre points of the respective arches are in each case located on different sides—when viewed in longitudinal section—of a longitudinal centre axis of the self-piercing rivet to the respectively associated arch.

In the case of the two above-mentioned embodiments—in the form of truncated cone or in the form of an arch—it is advantageous for the self-piercing forces acting from the head end to be introduced suitably into the foot end.

All in all, it is additionally preferred when the central recess does not comprise a cylindrical portion.

A cylindrical portion in the recess can lead to instability and, where applicable, fractures in the case of very high punching pressures.

The stability of the self-piercing rivet overall can be increased by dispensing with a cylindrical portion inside the recess.

According to a further embodiment, the central recess has a recess volume, wherein a ratio of the recess volume to the volume of the shank is smaller than 0.25, in particular smaller than 0.18 and/or greater than 0.05, in particular greater than 0.1.

The recess volume is calculated in this connection proceeding from the foot end of the self-piercing rivet. The volume of the shank is the volume of the shank where the shank comprises a standard outside diameter, that is exclusively a possible transition portion toward a head of the self-piercing rivet, but including the recess volume which is consequently also contained in the volume of the shank.

The relatively small recess volume on the one hand produces a high level of stability for the self-piercing rivet. On the other hand, a slug detached from the upper workpiece is not received by the recess but rather during the self-piercing operation is pushed by the rivet in front of itself. The advantageous achievement here is that material is reshaped to a greater extent inside a die of a self-piercing riveting tool instead of being deformed inside the recess.

According to a further preferred embodiment, the flat surface portion is realized as a circular surface portion and comprises, in cross section, a radial width, wherein the ratio of the radial width of the circular surface portion to the shank diameter is greater than 0.05 and/or smaller than 0.25.

The self-piercing rivet is preferably produced from a steel with a hardness of at least 500 HV10 (1630 MPa), in particular with a hardness of at least 650 HV10, in particular with at least 700 HV10. As a rule, the hardness is less than 800 HV10.

In the case of the self-piercing riveted joint according to the invention, it is preferred when the axial thickness of the upper workpiece is greater than or equal to the axial depth of the central recess in the non-deformed state.

In addition, it is advantageous in the case of the self-piercing riveted joint according to the invention when a slug is separated from the upper workpiece and when less than 50% of the volume of the slug is situated inside the deformed central recess, in particular less than 30%, preferably less than 25% and particularly preferred less than 20%.

This results from the self-piercing rivet being realized such that it is compressed in a substantial manner, as a result of which the volume of the recess is reduced such that the slug is pushed substantially in front of the rivet during the self-piercing riveting operation.

As a result, material of the lower workpiece can be displaced in a suitable manner inside the die by means of the slug such that it flows behind an undercut of the shank of the self-piercing rivet.

All in all, it is additionally advantageous when the shank of the reshaped self-piercing rivet forms an undercut in relation to forces in the direction of the head, wherein the ratio of undercut to shank diameter is smaller than 0.1 and/or greater than 0.01.

This results in the extent of the undercut being comparatively small. When joining high tensile steels, a small undercut of this type, however, is sufficient to realize the necessary joint strength.

According to a further preferred embodiment of the self-piercing riveted joint, the ratio of the axial length of the self-piercing rivet after the reshaping and of the axial length of the self-piercing rivet prior to the reshaping is greater than 0.8 and/or smaller than 0.95.

This results in the self-piercing rivet only being compressed in a comparatively small manner on account of its predetermined hardness, which also results in a relatively small undercut in the radial direction.

This also results in the minimum length of the self-piercing rivet preferably being produced from the thickness of the upper workpiece plus a value of preferably 3 or 3.5 mm, whereas the maximum length of the self-piercing rivet is preferably calculated by the overall thickness of the workpiece arrangement plus 1 mm or is equal to the overall thickness of the workpiece arrangement.

Generally speaking, it is also possible to carry out a self-piercing riveting procedure with the self-piercing rivet according to the invention where a self-piercing riveted joint is produced, in particular a self-piercing riveted joint of the type described above, having the steps of providing a workpiece arrangement, which comprises at least one upper and one lower workpiece, and of driving a self-piercing rivet of the type according to the invention into the workpiece arrangement at a self-piercing force.

In the case of said method, it is advantageous when the workpiece arrangement is supported on a die with a die volume, into which at least the lower workpiece is driven, the ratio of die volume to a volume of the self-piercing rivet preferably being greater than or equal to 1.0 and/or smaller than or equal to 1.5.

The die volume is the volume into which material at least of the lower workpiece flows during the self-piercing riveting operation, the upper edge of the die recess, provided for this purpose, being substantially flush with a support surface. The die recess, in this case, is preferably in the form of a truncated cone, with a relatively large diameter in the region of the contact surface and a smaller diameter in the region of a bottom of the die volume.

All in all, the following can be additionally noted in a supplementary manner. In the case of conventional self-piercing riveting, the forming of the undercut is a feature that is relevant to the quality of the joint strength. When the rivet according to the invention has more strength, this feature is no longer exclusively applicable. The rivet then requires a relatively firm upper workpiece, the slug of which the compresses the rivet and, at the same time, presses it somewhat apart. The undercut in the joint is not generated by a classic spreading apart in contrast to rivets of the prior art, but rather as a result of a compressing of the rivet which is brought about as a result of the counter pressure of the high tensile steel. In the case of such rivets, the application range begins as a rule initially at 800 N/mm², in particular at 1000 m N/mm² tensile strength of the upper workpiece. Steels of said strength category have been used in vehicle construction as a result of the reinforced use of lightweight structures produced from high tensile metal sheets. The scope of use of said self-piercing rivet downward is preferably limited by a minimum self-piercing force of 8 kN—the force to perforate/punch through the high tensile workpiece arrangement. A sufficient compressing (not primarily spreading) of the self-piercing rivet starts from said force, and the necessary extent of compression, which is preferably at least 0.15 mm, is obtained. To evaluate the joint quality, the compression extent must be looked at along with the formation of the undercut. The compression extent is calculated from the axial length of the self-piercing rivet prior to the reshaping minus the axial length of the self-piercing rivet after the reshaping, i.e. in the set state.

It is obvious that the features named above and those yet to be explained below are usable not only in the combination provided in each case, but also in other combinations or standing on their own without departing from the framework of the present invention.

BRIEF DESCRIPTION OF THE DRAWINGS

Exemplary embodiments of the invention are shown in the drawing and are explained in more detail in the following description, in which:

FIG. 3 shows a longitudinal sectional view through self-piercing riveted joints which are produced by means of self-piercing riveting.

FIG. 4 shows a longitudinal sectional view comparable to FIG. 1 through an embodiment of a self-piercing rivet according to the invention.

FIG. 5 shows a view of a detail V in FIG. 4.

DETAILED DESCRIPTION OF THE PREFERRED EMBODIMENTS

Figure 1:
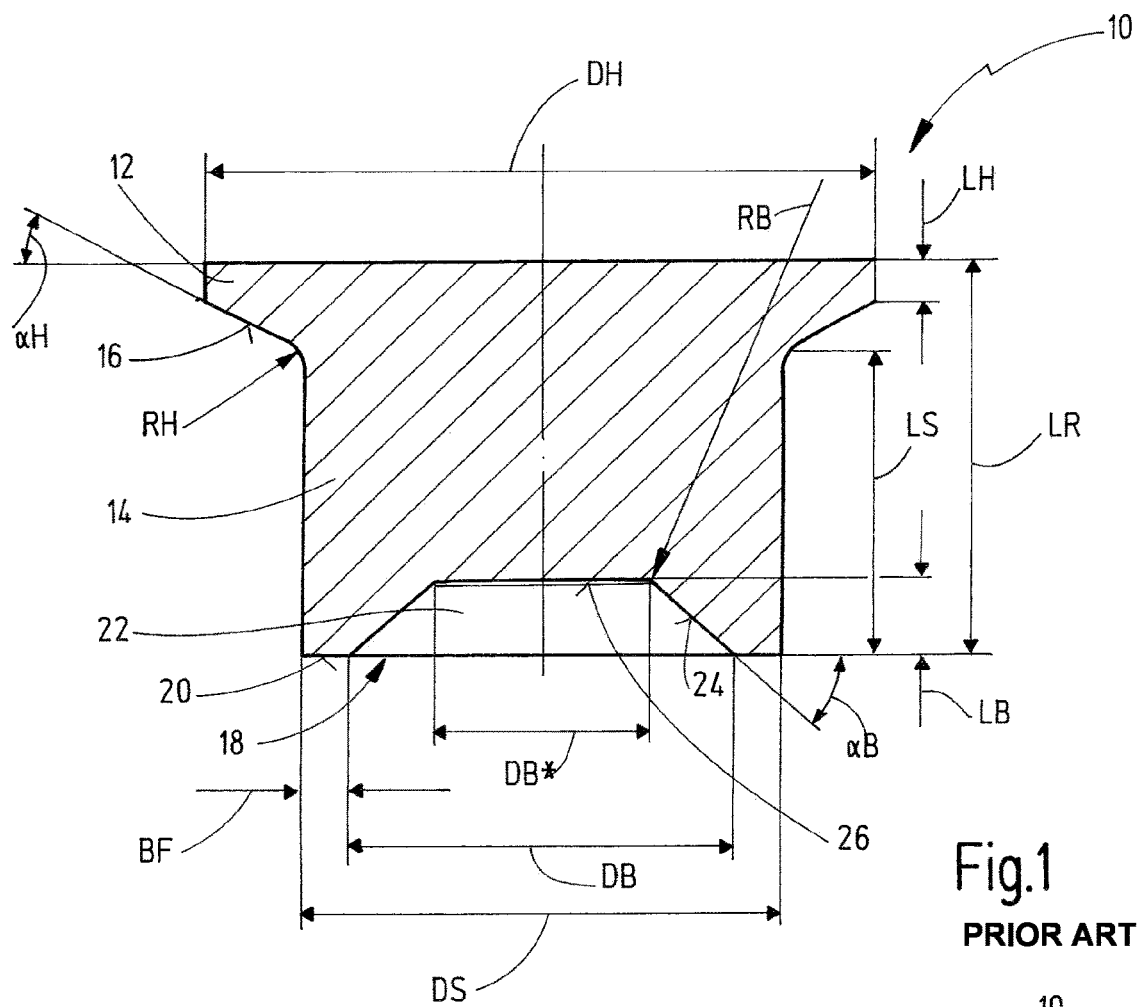
FIG. 1 shows a longitudinal sectional view through an embodiment of a self-piercing rivet of the prior art.

FIG. 1 shows a schematic representation of a longitudinal section of a rotationally symmetrical half-hollow self-piercing rivet which is designated in general by way of the reference 10.

The self-piercing rivet 10 is produced from a solid steel and preferably comprises a hardness greater than 500 HV. The self-piercing rivet is produced, in particular, as a result of pressure forming.

The self-piercing rivet 10 comprises a head 12 and a shank 14 which connects hereto in the axial direction. The shank 14 merges into the head 12 by means of a transition portion 16. An end of the shank 14 located opposite the head 12 is realized as a foot end and is designated in FIG. 1 by way of the reference 18.

A flat surface portion 20 is realized on the foot end 18, said flat surface portion being realized as a circular surface portion, the outside diameter of which is defined by an outside diameter of the shank 14 and the inside diameter of which is defined by an edge of a recess 22 which extends from the foot end 18 in the direction toward the head 12.

The recess 22 is realized in the form of a truncated cone in FIG. 1 and comprises, proceeding from the foot end 18, a conically extending recess transition portion 24 and a recess bottom 26. The recess bottom 26 can be realized in a flat manner, as shown, but can also be realized in a concave or convex manner.

In addition, the following dimensions are shown in FIG. 1, the preferred values for said dimensions also being entered in each case in the following table:

| Designation | Abbreviation | Preferred value | Comment |
| --- | --- | --- | --- |
| Axial length of self-piercing rivet | LR | 5 mm | |
| Length of shank | LS | 3.6 mm | |
| Axial height of head | LH | 0.5 mm | |
| Axial depth of recess | LB | 1 mm | |
| Diameter of head | DH | 7.75 mm | |
| Outside diameter of shank | DS | 5.5 mm | |
| Recess diameter on foot end | DB | 4.5 mm | |
| Recess diameter on bottom | DB' | ~2.5 mm | |
| Radial width of circular surface portion | BF | 0.5 mm | |
| Cone angle of recess | αB | ~40° | e.g. 25°-50° |
| Cone angle-transition portion | αH | ~27° | e.g. 20°-50° |

In the case of the self-piercing rivet in FIG. 1, the ratio of the axial depth LB of the recess 22 to the shank diameter DS is approximately 0.18.

The ratio of the radial width BF to the shank diameter DS is approximately 0.09.

In addition, the ratio of the recess volume to the volume of the shank is approximately 0.135, the volume of the recess being calculated approximately to $$VB=(LB\cdot\pi)/3\cdot[(DB/2)^2+DB\cdot DB'+[(DB'/2)^2],$$

and the volume of the shank being calculated to $$VS=\pi\cdot(DS/2)^2\cdot LS.$$

The volume VS of the shank consequently includes the recess volume VB.

The values provided in the above table for the respective dimensions and angles can preferably deviate within the framework of the invention up or down in each case by at least 20%, preferably up and down in each case by 10%.

FIG. 1 also shows a radius RB which is realized at the transition between the recess transition portion 24 and the recess bottom 26. The value of RB can be, for example, 0.35 mm. The value of DB' is an approximated value which lies, for instance, in the centre of the radius RB, when viewed in the radial direction.

In addition, FIG. 1 also shows a radius RH which forms the transition between the conical transition portion 16 and the shank 14. The value of RH can be, for example, 0.5 mm or less.

Figure 2:
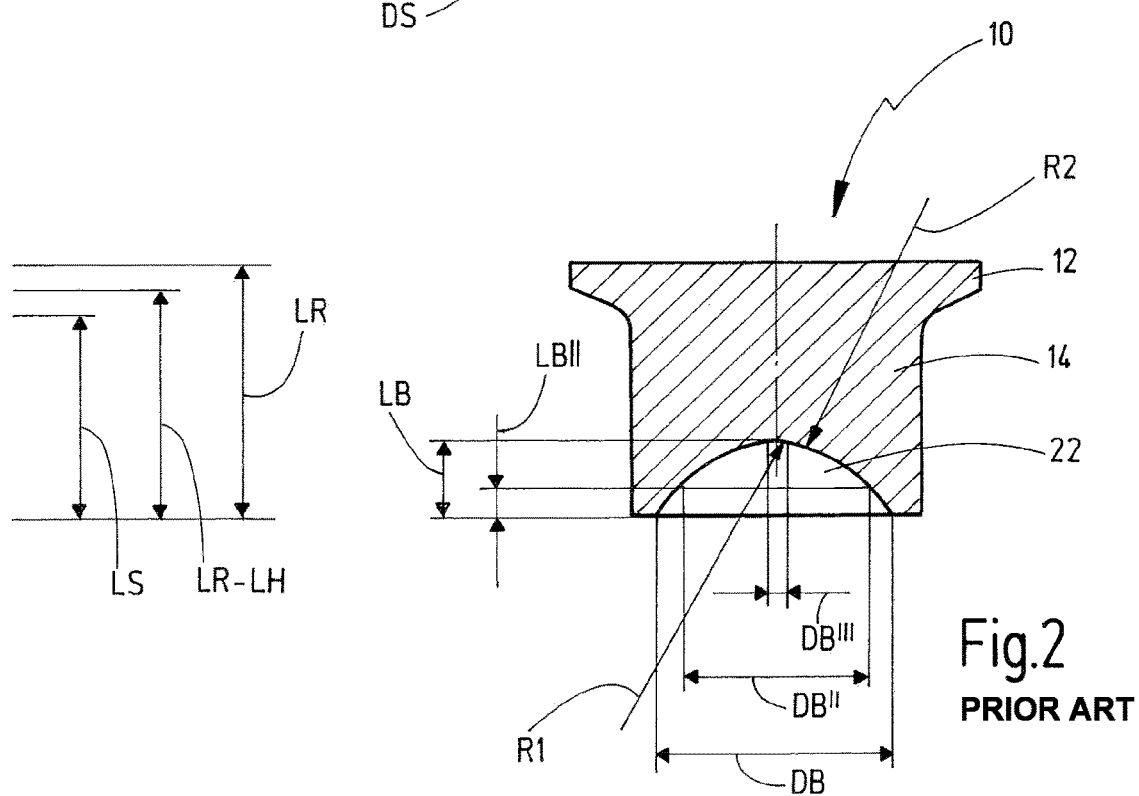
FIG. 2 shows a longitudinal sectional view through a further embodiment of a self-piercing rivet of the prior art.

An alternative embodiment of a self-piercing rivet is shown in FIG. 2 and is also given the general reference of 10. The self-piercing rivet 10 in FIG. 2 corresponds in general to the self-piercing rivet 10 in FIG. 1 as regards design and method of operation. Identical elements are consequently characterized by identical reference symbols. It is essentially the differences that will be explained below.

The recess 22 of the self-piercing rivet 10 in FIG. 2 is not in the form of a truncated cone as in the case of the self-piercing rivet 10 in FIG. 1, but is realized in an arcuate manner. More precisely, in longitudinal section the recess 22 in FIG. 2 has the form of a pointed arch which is composed from two circular arches which form an apex on a longitudinal axis. The origins of the circular arcs are in each case on the side of the longitudinal axis located opposite their circular arc. In the region of the apex, which is formed by the two circular arcs, the recess is rounded with a radius which can be, for example, 0.5 mm. Said radius is indicated schematically in FIG. 2 by way of the reference R1.

The radius of the two circular arcs is indicated schematically in FIG. 2 by way of the reference R2 and can be, for example, approximately 4 mm.

In the case of the self-piercing rivet 10 in FIG. 2, the maximum axial depth of the recess 22 is preferably approximately 1.5 mm such that a ratio LB/DS of approximately 0.273 is produced.

The diameter DS and the axial length LS as also other dimensions can be identical to those of the self-piercing rivet 10 in FIG. 1.

FIG. 3 shows on the left-hand side a schematic representation of a longitudinal section of a self-piercing riveted joint produced by means of the self-piercing rivet 10 in FIG. 1 and designated in general by way of the reference 30.

The self-piercing riveted joint 30 joins a workpiece arrangement 32 which includes at least one upper workpiece 34 and one lower workpiece 36, from which at least the upper workpiece can be produced as a steel sheet from high tensile or super high tensile steels.

FIG. 3 shows that the self-piercing rivet 10* has cut a slug 38 from the upper workpiece 34 and has pushed it in front of it during the self-piercing riveting operation. The residual bottom thickness between the bottom surface of the slug and the bottom surface of the lower workpiece 36 is designated by way of the reference 40. This can, for example, be greater than 0.5 mm.

In addition, FIG. 3 shows a radial undercut of the reshaped shank 14*. As a result of the relatively hard material of the upper workpiece 34, the self-piercing rivet 10* has been compressed in particular in the region of the foot end such that the material thereof in the region of the foot end has flowed radially somewhat outward. On account of the high level of hardness also of the self-piercing rivet 10*, the undercut 42 is very small and can be, for example, smaller than 0.5 mm, but is, as a rule, greater than 0.05 mm.

Correspondingly, the ratio of undercut 42 to shank diameter DS is preferably within a range of between 0.1 and 0.01.

Finally, FIG. 3 shows a protrusion 44 by which the head 12* protrudes in relation to the upper surface of the upper workpiece 34. The protrusion 44 is preferably smaller than the axial height LH of the self-piercing rivet 10 in the non-deformed state.

In addition, FIG. 3 shows the axial length LR* of the reshaped self-piercing rivet 10*. Said length can be, for example, approximately 4.4 mm in the example shown. The ratio of the axial length LR* of the self-piercing rivet 10* after the reshaping and the axial length LR of the self-piercing rivet 10 prior to the reshaping is preferably greater than 0.8 and/or smaller than 0.95.

The self-piercing rivet 10* has been compressed, as said, in the region of the foot end such that the remaining volume of the remaining recess 22* is relatively small. Accordingly, a maximum of portion of 50%, in particular a maximum portion of 25% of the volume of the slug 38 is received inside the deformed recess 22* in the embodiment shown.

The axial thickness of the upper workpiece 34 is designated by way of the reference L34. This can be greater than or equal to the axial depth LB of the self-piercing rivet 10 in the non-deformed state. The axial thickness of the lower workpiece 36 is designated by way of the reference L36. This is preferably greater than L34. The bottom workpiece 36 is preferably softer than the upper workpiece 34.

FIG. 3 additionally shows a schematic representation of a die 50 of a self-piercing riveting tool, by means of which an axial force (self-piercing force) 52 is exerted onto the upper surface of the head 12 of the self-piercing rivet 10 during the self-piercing riveting operation. The recess of the die 50 is realized in the approximate form of a truncated cone. The somewhat softer material of the second workpiece 34 is pushed away radially by the slug 38 and the die 50 and, in this connection, flows behind the undercut 42 such that the self-piercing riveted joint 30 sets up a positive locking connection between the workpieces 34, 36.

The volume of the die recess is preferably greater than or equal to the volume of the self-piercing rivet 10 in the non-deformed state. In particular, the ratio of the die volume to the volume of the self-piercing rivet 10 is preferably greater than or equal to 1.0 and/or smaller than or equal to 1.5.

The minimum self-piercing force 52 is preferably 8 kN.

The minimum length of the self-piercing rivet 10 in the non-deformed state is produced from the thickness L34 plus a value which can be for example 3 or 3.5. The maximum length of the self-piercing rivet 10 in the non-deformed state can be equal to the overall thickness L34+L36 or a value which is equal to the overall thickness+a value of, for example, 1 mm is formed.

The upper workpiece 34 preferably has a tensile strength within the range of greater than 800 N/mm$^2$, in particular greater than 1000 N/mm$^2$. The lower workpiece 36 preferably has a tensile strength of less than 600 N/mm$^2$. The self-piercing rivet 10 preferably comprises a hardness in excess of 650 HV (according to Vickers).

FIGS. 4 and 5 show an embodiment of a self-piercing rivet 10' according to the invention. The self-piercing rivet 10' corresponds in general to the self-piercing rivet 10 in FIG. 1 as regards design and method of operation. Identical elements are consequently characterized by identical reference symbols. It is essentially the differences that are explained below.

Whilst in the case of the self-piercing rivet 10 in FIG. 1, a transition portion 16 between the shank 14 and the head outside diameter is formed substantially by a positive radius RH and a conical surface which connects thereto up to the outside periphery of the head 12, the self-piercing rivet 10' in FIGS. 4 and 5 comprises a head 12', the transition portion 16' of which includes an axial circular (alternatively described as "annular") recess 60. The axial circular recess 60 is formed such that the portion of the head 12' protruding radially in relation to the shank 14' is able to be bent in relation to a virtual radial plane, about a virtual circular rotational axis 62 as is shown in FIG. 4 by way of the reference 64.

As, in the case of the intended self-piercing riveted joints, the upper workpiece 34 is preferably produced from a very solid material, the outer portion of the head 12' may consequently bend up, where applicable, during the execution of a self-piercing riveting operation. As a result, the setting force necessary for producing the self-piercing riveted joint can be reduced. This, in turn, can lead to smaller stresses during a self-piercing riveting operation, in particular in the region of the transition portion 16'. As a result, the forming of cracks in the region of the transition portion 16' can be reduced or avoided.

The axial circular recess 60 includes a first radial recess portion 66, which faces the shank 14', as well as a second radial recess portion 68 which is remote from the shank 14'.

The first radial recess portion 66 comprises a greater axial depth than the second radial recess portion 68. The axial circular recess 60 is realized overall in the region of a head bottom surface 70 of the head 12', preferably in such a manner that the recess 60 is directly adjacent the shank 14' or the outside diameter DS of the shank 14' (see FIG. 1).

As shown in FIG. 5, the circular recess 60 comprises a radial length DA which is smaller than a radial head protrusion length ΔD. A ratio of DA to ΔD is preferably greater than 0.4 and preferably smaller than 0.9.

The axial circular recess 60 additionally comprises an axial depth LA. A ratio of the axial depth LA to an axial head height LH' is preferably greater than 0.25 and preferably smaller than 0.6.

An axial residual thickness LR of the head 12' a preferably greater than an axial depth LA of the axial circular recess 60.

The axial depth LA of the circular recess 68 proceeds from the head bottom surface 70.

As the radial circular recess 60 is radially shorter than the head protrusion, it is preferred when a head bottom surface portion, which, as can be seen in particular in FIG. 4, is preferably chamfered, is realized radially outside the axial circular recess 60. The angle of the chamfer is shown in FIG. 4 by way of the reference αH' and is preferably within a range of between 2° and 25°. The angle of the chamfer αH' corresponds preferably to an angle by which the protruding portion of the head 12' can be bent during a self-piercing riveting operation. This is shown on the right-hand side in FIG. 3. The protruding part of the head 12'\* of the reshaped self-piercing rivet 10'\* of a self-piercing riveted joint 30' produced in this manner is also bent by an angle αH' in relation to a radial plane. As a result of the chamfer, a substantially flat abutment against an upper surface of the upper workpiece 34 can be achieved in this case such that the finished self-piercing riveted joint is able to be sealed.

As is shown in FIG. 5, the axial circular recess 60 is preferably formed by a plurality of radii $RA_1$, $RA_2$, $RA_3$.

The radius $RA_3$ proceeds from the shank outside diameter and comprises a value within a range of between 0.05 and 0.3 mm. A radius $RA_2$, which is preferably greater than the radius $RA_3$, preferably at least five times as great as $RA_3$, connects thereto in the outward radial direction. The value of $RA_2$ is preferably within a range of between 0.5 and 2 mm.

The radii $RA_3$ and $RA_2$ are curved in an identical manner. The radius $RA_1$, which is curved in the opposite direction and merges continuously into the chamfered outer portion of head 12', connects to the radius $RA_2$ in the outward radial direction. The radius $RA_1$ is preferably greater than the radius $RA_3$ and is preferably smaller than the radius $RA_2$ and is preferably within a range of between 0.2 and 0.8 mm.

The radii $RA_1$, $RA_2$ and $RA_3$ are chosen in such a manner and connect to the adjacent portions in such a manner that the axial circular recess 60 is formed substantially by a continuous form.

It can additionally be seen in FIG. 4 that the bottom 26' of the truncated-cone-shaped recess 22' is realized in a cone-shaped manner with a cone angle αC which is smaller than the cone angle αB' of the recess 22'.

The axial length of the cone-shaped bottom 26' is shown schematically in FIG. 4 by way of the reference LK. LK is preferably clearly smaller than LB', in particular smaller than a third of LB', in particular smaller than a quarter of LB'.

The transitions between the cone portions of the recess 22' and of the bottom 26' can be rounded, by means of corresponding radii which are not shown, however, in FIG. 4 for reasons of clarity.

Further embodiments of self-piercing rivets according to the invention are shown in FIGS. 6 to 13. Said self-piercing rivets are produced, as a rule, from a softer material than the above-described self-piercing rivets and comprise a clearly greater ratio of the axial length of the central recess to the outside diameter of the shank. In addition, preferably no flat, purely radially aligned surface portion is provided at the foot end. Instead of which, the foot end of the shank ends in a circular cutter 80, as has been known, for example, from the so-called C-rivet.

However, all the rivets shown in FIGS. 6 to 13 also comprise, as the above-described self-piercing rivet, an axial circular recess as well as a head, the development, form and function of which can correspond in general to the axial circular recess and the head which have been described above with reference to the exemplary embodiment in FIGS. 4 and 5. Identical elements are consequently characterized by identical reference symbols. It is substantially the differences that are explained below.

Figure 6:
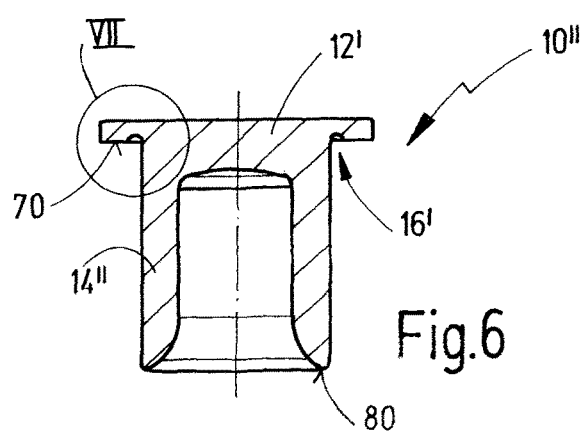
FIG. 6 shows a longitudinal sectional view through a further embodiment of a self-piercing rivet according to the invention.
Figure 7:
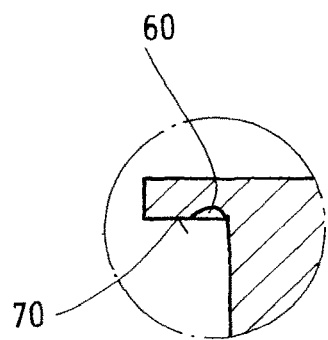
FIG. 7 shows a view of a detail VII in FIG. 6.

A head 12', the head bottom surface 70 of which is realized in a similar manner as the head bottom surface of the self-piercing rivet 10' of FIGS. 4 and 5, is provided in the case of the self-piercing rivet 10" shown in FIGS. 6 and 7. However, the radially outermost portion of the head bottom surface 70 is not chamfered but is just aligned in a radial manner.

In addition, the ratio of the radial length of the circular recess 60 to the head protrusion length is preferably greater than 0.25 and preferably smaller than 0.6. Said ratio is provided in a preferably identical manner in the case of the following embodiments in FIGS. 8 to 13.

Figure 8:
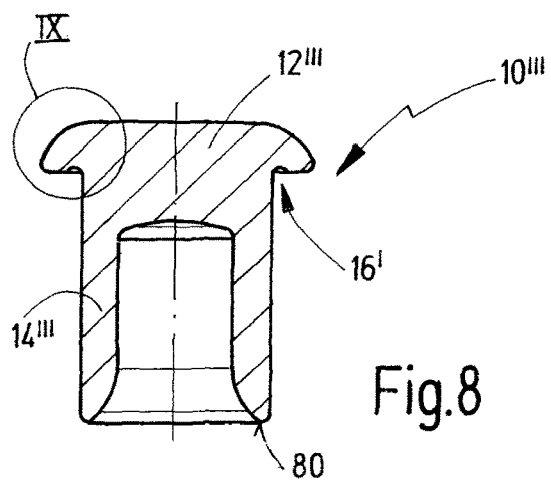
FIG. 8 shows a longitudinal sectional view through a further embodiment of a self-piercing rivet according to the invention.
Figure 9:
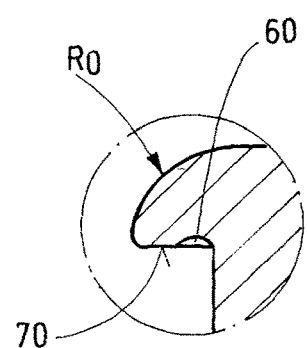
FIG. 9 shows a view of a detail IX in FIG. 8.

FIGS. 8 and 9 show a self-piercing rivet 10''' which comprises a head 12''', the axial head length of which is clearly greater compared to the embodiments in FIGS. 4 to 7, such that the ratio of the axial depth of the axial circular recess 60 to the axial head height is smaller than 0.4 and preferably greater than 0.15.

In addition, in the case of the embodiment in FIGS. 8 and 9 a head upper surface of the head 12''' merges into the region of the head bottom surface by means of a large radius RO.

Figure 10:
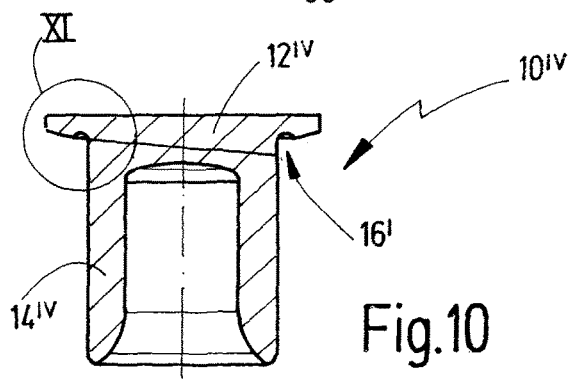
FIG. 10 shows a longitudinal sectional view through a further embodiment of a self-piercing rivet according to the invention.
Figure 11:
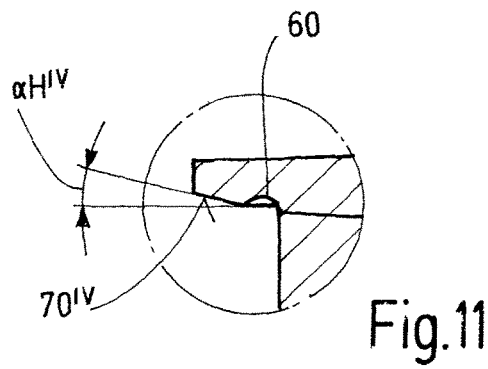
FIG. 11 shows a view of a detail XI in FIG. 10.

A self-piercing rivet $10^{IV}$ shown in FIGS. 10 and 11 comprises a head $12^{IV}$, the head bottom surface $70^{IV}$ of which, radially outside the axial circular recess 60, is chamfered in total at an angle $\alpha H^{IV}$ which can be within a range of between 5° and 30°.

Figure 12:
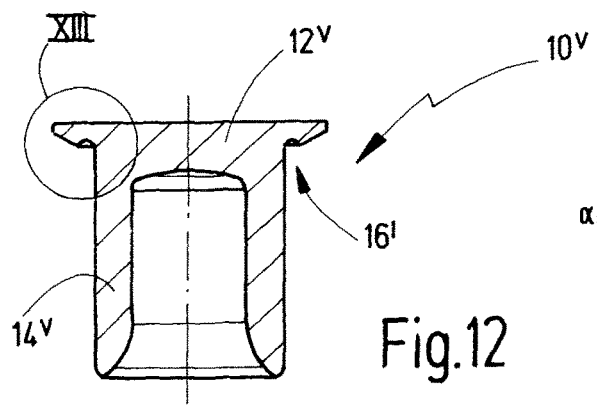
FIG. 12 shows a longitudinal sectional view through a further embodiment of a self-piercing rivet according to the invention.
Figure 13:
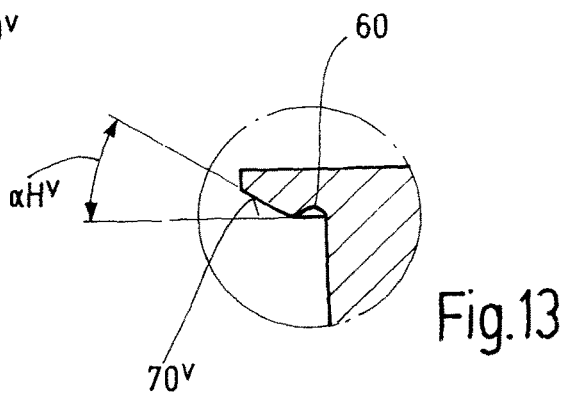
FIG. 13 shows a view of a detail XIII in FIG. 12.

In the case of a self-piercing rivet $10^V$ shown in FIGS. 12 and 13, a head $12^V$ with a head bottom surface $70^V$ is shown where a portion radially outside the axial circular recess 60 is inclined overall at an angle $\alpha H^V$ which can be within a range of between 25° and 45°.

In the case of the self-piercing rivets 10', 10", $10^{IV}$ and $10^V$, an outside surface of the respective head is realized in a cylindrical manner, that is to say aligned in a substantially parallel manner to the longitudinal axis. The outside surface of the head 12''' is formed by a radius RO purely in the case of the self-piercing rivet 10'''.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A self-piercing rivet for joining at least two workpieces, the self-piercing rivet comprising:
    a head defining a head diameter (DH) and including a head bottom surface;
    a shank defining a shank diameter (DS), and wherein the shank, on a foot end located opposite the head partially defines an axial recess which has an axial depth (LB), and the shank also includes one of a flat surface portion or a circular cutter on the foot end; and
    a transition portion located between the head and the shank and partially defining an annular recess open axially downwards; and
    wherein the annular recess is formed by a curve including a first radius, a second radius, and a third radius;
    wherein the second radius and a third radius are proximate to the shank and are upward pointing;
    wherein the first radius is furthest outward from the shank and is downward pointing and the curve merges outwardly and continuously into the head bottom surface;
    wherein the first radius connects to the second radius;
    wherein the first radius, the second radius, and the third radius transition such that the annular recess has a continuous form; and
    wherein the annular recess is formed such that a portion of the head protruding radially in relation to the shank is able to be bent in relation to a virtual radial plane, about a virtual circular rotational axis during a self-piercing riveting operation.

2. A self-piercing rivet according to claim 1, wherein a ratio of the axial depth (LB) of the axial recess to the shank diameter (DS) is smaller than 0.3.

3. A self-piercing rivet according to claim 1, wherein the transition portion includes the head bottom surface which is substantially perpendicular to a longitudinal axis of the self-piercing rivet.

4. A self-piercing rivet according to claim 1, wherein the transition portion includes the head bottom surface which is aligned at an angle of between 5° and 45° with reference to a radial plane perpendicular to a longitudinal axis of the self-piercing rivet.

5. A self-piercing rivet according to claim 1, wherein the annular recess is located in the head bottom surface of the head which protrudes radially in relation to the shank.

6. A self-piercing rivet according to claim 1, wherein the annular recess includes a first radial recess portion proximate the shank and a second radial recess portion distal the shank, and the first radial recess portion defines a first axial depth greater than a second axial depth defined by the second radial recess portion.

7. A self-piercing rivet according to claim 1, wherein a ratio of the radial length (DA) of the annular recess to a radial head protrusion length ($\Delta D$) is greater than 0.2.

8. A self-piercing rivet according to claim 7, wherein the head bottom surface of the head is chamfered in a portion radially outside the annular recess.

9. A self-piercing rivet according to claim 1, wherein a ratio of an axial depth (LA) of the annular recess to an axial head height (LH') is greater than 0.15.

10. A self-piercing rivet according to claim 1, wherein a longitudinal section the axial recess is in the form of a truncated cone, and a recess bottom of the axial recess is in the form of a cone, and a ratio of a cone angle of the axial recess bottom to a cone angle of the axial recess is smaller than 0.4.

11. A self-piercing rivet according to claim 1, wherein the axial recess does not include a cylindrical portion.

12. A self-piercing rivet according to claim 1, wherein the axial recess has a recess volume, and a ratio of the recess volume to a volume of the shank is smaller than 0.25.

13. A self-piercing rivet according to claim 1, wherein the flat surface portion is a circular surface portion and includes, in cross section, a radial width (BF), and wherein the ratio of the radial width (BF) of the circular surface portion to the shank diameter (DS) is greater than 0.05 and smaller than 0.25.

14. A self-piercing rivet according to claim 1, wherein the self-piercing rivet is formed of a steel with a hardness of at least 500 HV10.

15. A riveted joint comprising:
    an upper workpiece and a lower workpiece, from which at least one is from a metal; and
    a self-piercing rivet, comprising:
        a head defining a head diameter (DH); and which, in a deformed state after setting, abuts against the upper workpiece;
        a shank which, in a nondeformed state before it is set in the joint, defines a shank diameter (DS) and partially defines an axial recess with an axial depth (LB), and includes a foot end located opposite the head, and further includes one of a flat surface portion or a circular cutter located on the foot end; and
        a transition portion located between the head and the shank and partially defining an annular recess; and
        wherein the annular recess is formed by a curve including a first radius, a second radius, and a third radius;
        wherein the second radius and a third radius are proximate to the shank and are upward pointing;
        wherein the first radius is furthest outward from the shank and is downward pointing and the curve merges outwardly and continuously into the head bottom surface;
        wherein the first radius connects to the second radius;
        wherein the first radius, the second radius, and the third radius transition such that the annular recess has a continuous form; and
        wherein the annular recess is formed such that a portion of the head protruding radially in relation to the shank is able to be bent in relation to a virtual radial plane, about a virtual circular rotational axis during a self-piercing riveting operation.

16. A riveted joint according to claim 15, wherein the axial thickness of the upper workpiece is at least equal to the axial depth (LB) of the recess in the non-deformed state.

17. A riveted joint according to claim 15, wherein a slug is separated from the upper workpiece and wherein less than 50% of the volume of the slug is located inside the recess of the deformed self-piercing rivet.

18. A riveted joint according claim 15, wherein the shank of the deformed self-piercing rivet forms an undercut, and the ratio of undercut to shank diameter (DS) is one of smaller than 0.1 and greater than 0.01.

19. A riveted joint according to claim 15, wherein a ratio of the axial length (LR*) of the deformed self-piercing rivet after setting and of the axial length (LR) of the undeformed self-piercing rivet prior to setting is one of greater than 0.8 or smaller than 0.95.

\* \* \* \* \*